Figure 1:
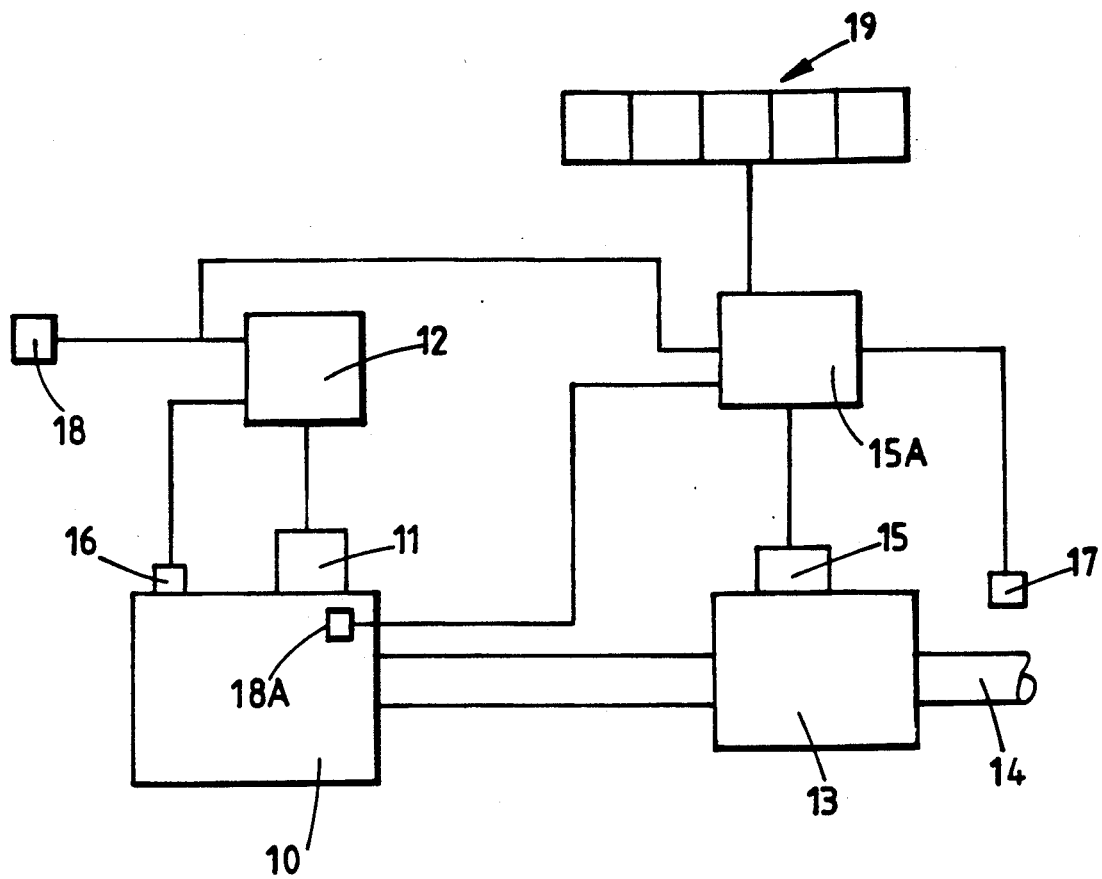

United States Patent [19]

Mason

[11] Patent Number: 5,201,889
[45] Date of Patent: Apr. 13, 1993

[54] POWER UNIT

[75] Inventor: Peter C. Mason, Leicester, England

[73] Assignee: Lucas Industries public limited company, England

[21] Appl. No.: 753,253

[22] Filed: Aug. 30, 1991

[30] Foreign Application Priority Data

Sep. 5, 1990 [GB] United Kingdom ............... 9019400

[51] Int. Cl.$^5$ ............................................. B60K 41/18
[52] U.S. Cl. ......................................... 74/866; 74/844;
74/856; 364/424.1; 364/431.04
[58] Field of Search ............... 74/844, 856, 857, 861,
74/864, 865, 866; 364/424.1, 431.04

[56] References Cited

U.S. PATENT DOCUMENTS

| | | | |
|---|---|---|---|
| 4,280,469 | 7/1981 | Ganoung | 74/866 X |
| 4,638,690 | 1/1987 | Hattori et al. | 74/866 |
| 4,732,055 | 3/1988 | Tateno et al. | 74/866 |
| 4,774,858 | 10/1988 | Ganoung | 74/866 X |
| 4,792,901 | 12/1988 | Mack et al. | 74/866 X |
| 4,905,544 | 3/1990 | Ganoung | 74/866 X |
| 4,943,921 | 7/1990 | Baltusis et al. | 74/866 X |

FOREIGN PATENT DOCUMENTS

| | | | |
|---|---|---|---|
| 2625770 | 12/1977 | Fed. Rep. of Germany | 74/861 |
| 60-146949 | 8/1985 | Japan | 74/844 |

*Primary Examiner*—Leslie A. Braun
*Assistant Examiner*—William O. Trousdell
*Attorney, Agent, or Firm*—Jenner & Block

[57] ABSTRACT

For a given vehicle speed the data in the maps is read out, and combined using weighting factors to determine the merit figure. The merit figures for the different possible gear ratios are compared and the ratio which gives the highest merit figures is selected.

4 Claims, 4 Drawing Sheets

POWER UNIT

This invention relates to a power unit for a vehicle, the power unit including an internal combustion engine and a gear box coupled to the engine and when in use is coupled to the driving wheels of the vehicle, the engine including an electronic fuel control system operable to control the delivery of fuel to the engine in response to a power demand signal set by the driver of the vehicle.

Such power units are known in which the control system determines the amount of fuel which is supplied to the engine in accordance with the demanded signal, the control system particularly in the case of a compression ignition engine acting to limit the maximum engine speed and also to impose a limit on the rate of fuel supply to the engine mainly to ensure that no more than a predetermined level of smoke exists in the engine exhaust. The selection of the gear box ratio may be effected by an electrical ratio control network which in general will be responsive to vehicle speed but may also be responsive to the driver demand. Usually the control network of the gear box will endeavor to ensure that the highest possible gear box ratio is selected, that is to say the ratio which for a given road speed results in the lowest engine speed. In some cases feedback is provided to the engine control system to effect a temporary adjustment to the fuel supplied to the engine to smooth the changes of gear ratio particularly where the gear box is of the discrete ratio type.

In general, therefore, in the known forms of power unit, the engine has been operated at as low a speed as possible to reduce noise and engine wear and in order to minimize fuel consumption.

The need to meet the exhaust emission laws which are in force in various countries of the world, has resulted in studies of the levels of various components in the exhaust of an engine at various engine speeds and loads. From the data obtained, it has been possible to construct maps for that particular type of engine from which, in a practical situation, it is possible to determine knowing the actual engine speed and load, the level of, for example, hydrocarbons in the engine exhaust. Examination of some data obtained as a result of the testing of one type of compression ignition engine reveals that the level of hydrocarbons, i.e. unburned fuel in the engine exhaust increases as the engine speed increases and particularly as the load on the engine is reduced. The data also reveals that the level of NOx increases, as the load on the engine increases but tends to fall as the engine speed increases. The smoke map has a more complex profile and in general the smoke level increases as the upper and lower limits of the engine speed range are approached tending also to increase as the load on the engine increases.

In the use of the vehicle, the driver using the throttle pedal sets a power demand, power being represented by the engine torque multiplied by the engine speed. Thus within the allowed engine speed range, the engine could, for example, operate at a low speed and develop a high torque or operate at a higher speed and a lower torque depending on the gear ratio selected. In the past as stated, the tendency has been to select the gear box ratio which gives the lowest engine speed.

The object of the present invention is to provide a power unit in a simple and convenient form.

According to the invention, a power unit of the kind specified comprises a plurality of maps containing pre-recorded data relative to the constituents of the engine exhaust and the engine fuel consumption respectively at various loads within the engine speed range, means for a given vehicle road speed and driver demand for determining from the data in the maps a merit figure for operation of the engine in the possible gear ratios of the gear box, and further means operable to indicate which gear ratio will provide the higher or highest merit figure or lowest cost figure.

Figure 2:
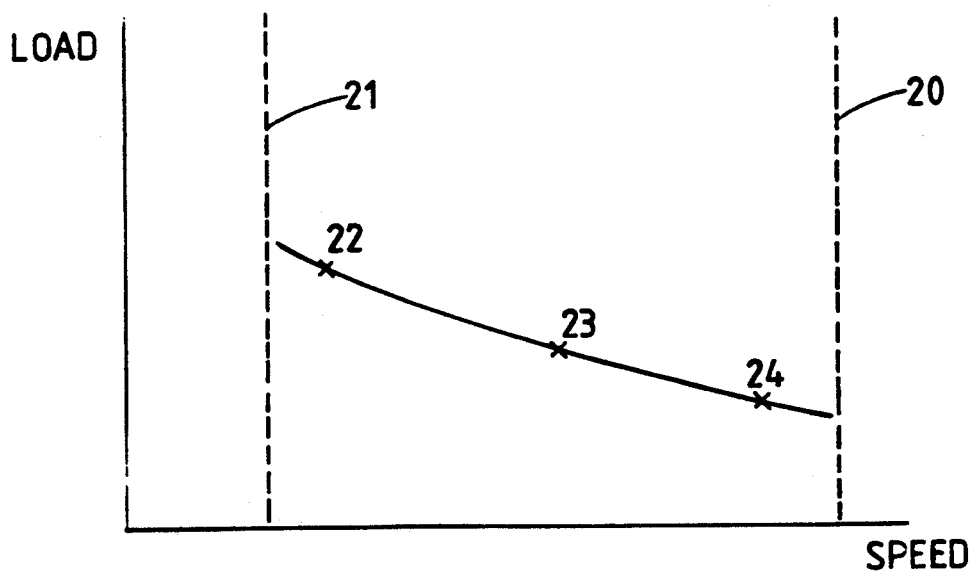
Figure 3:
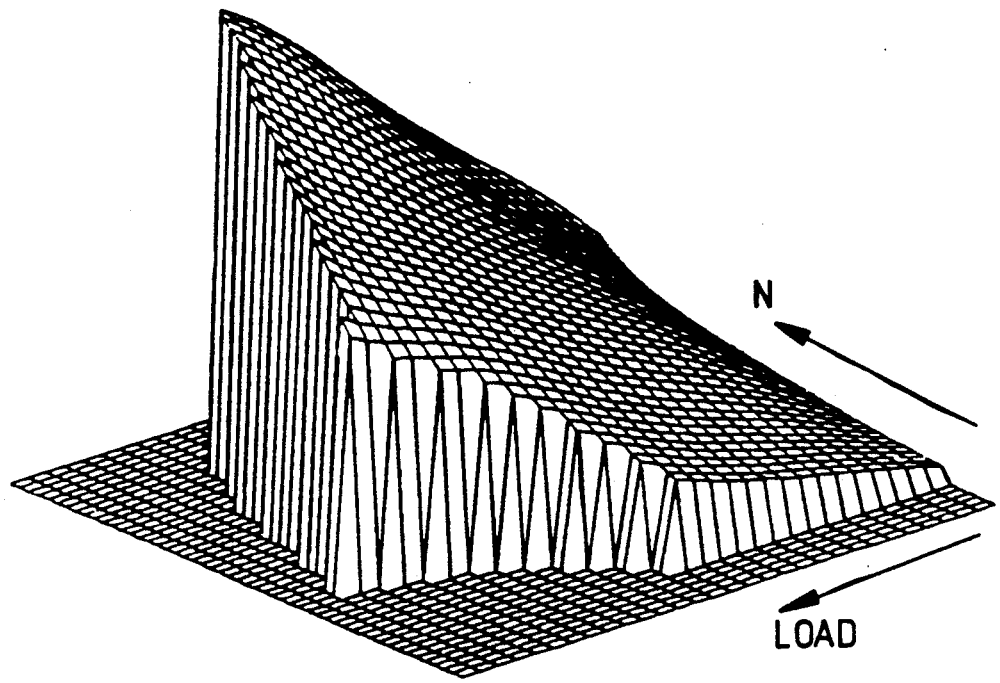
Figure 5:
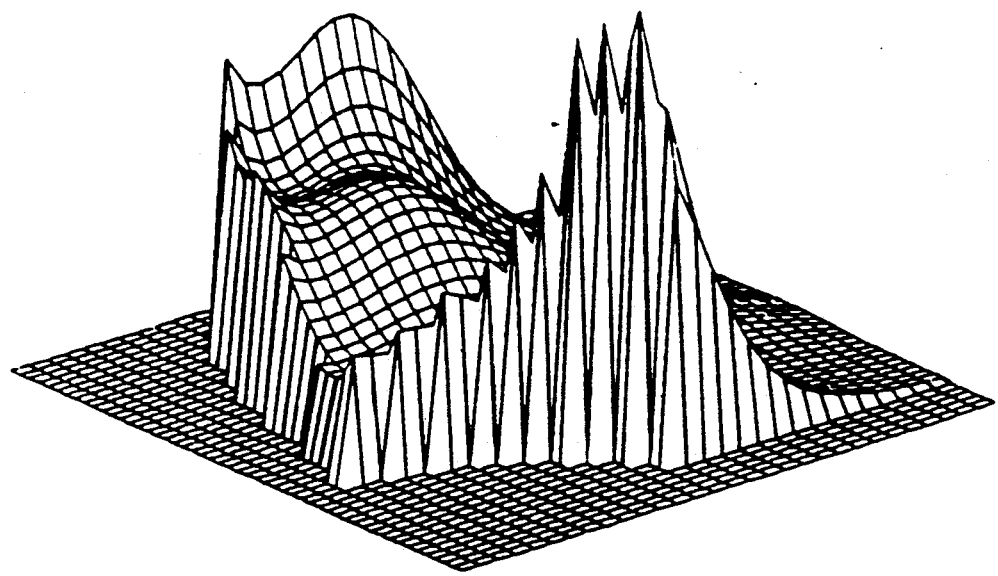
Figure 6:
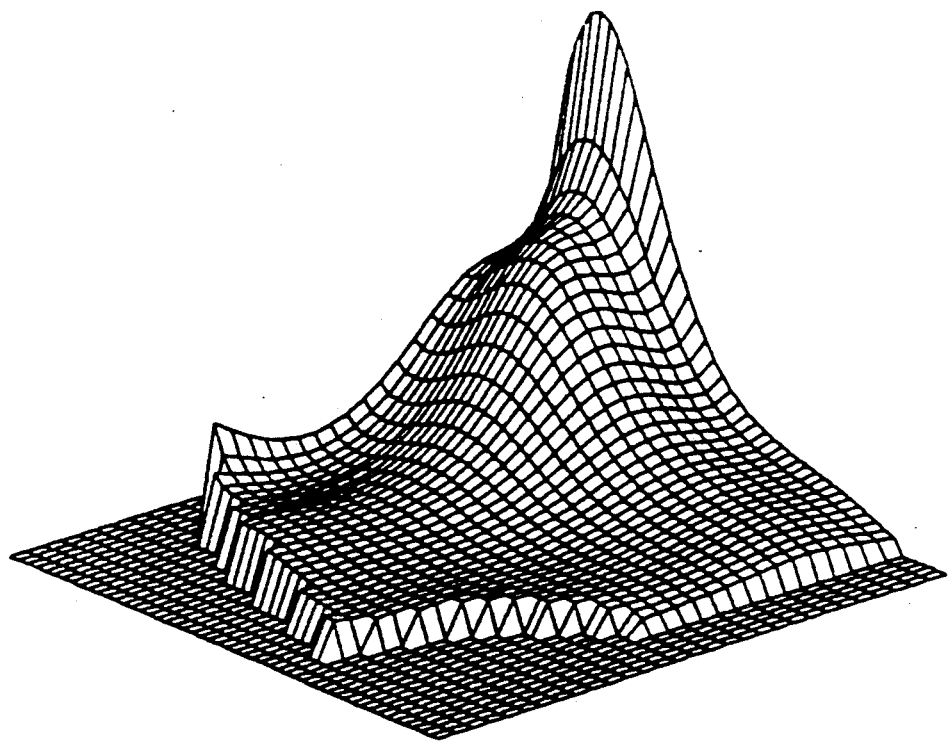
Figure 7:
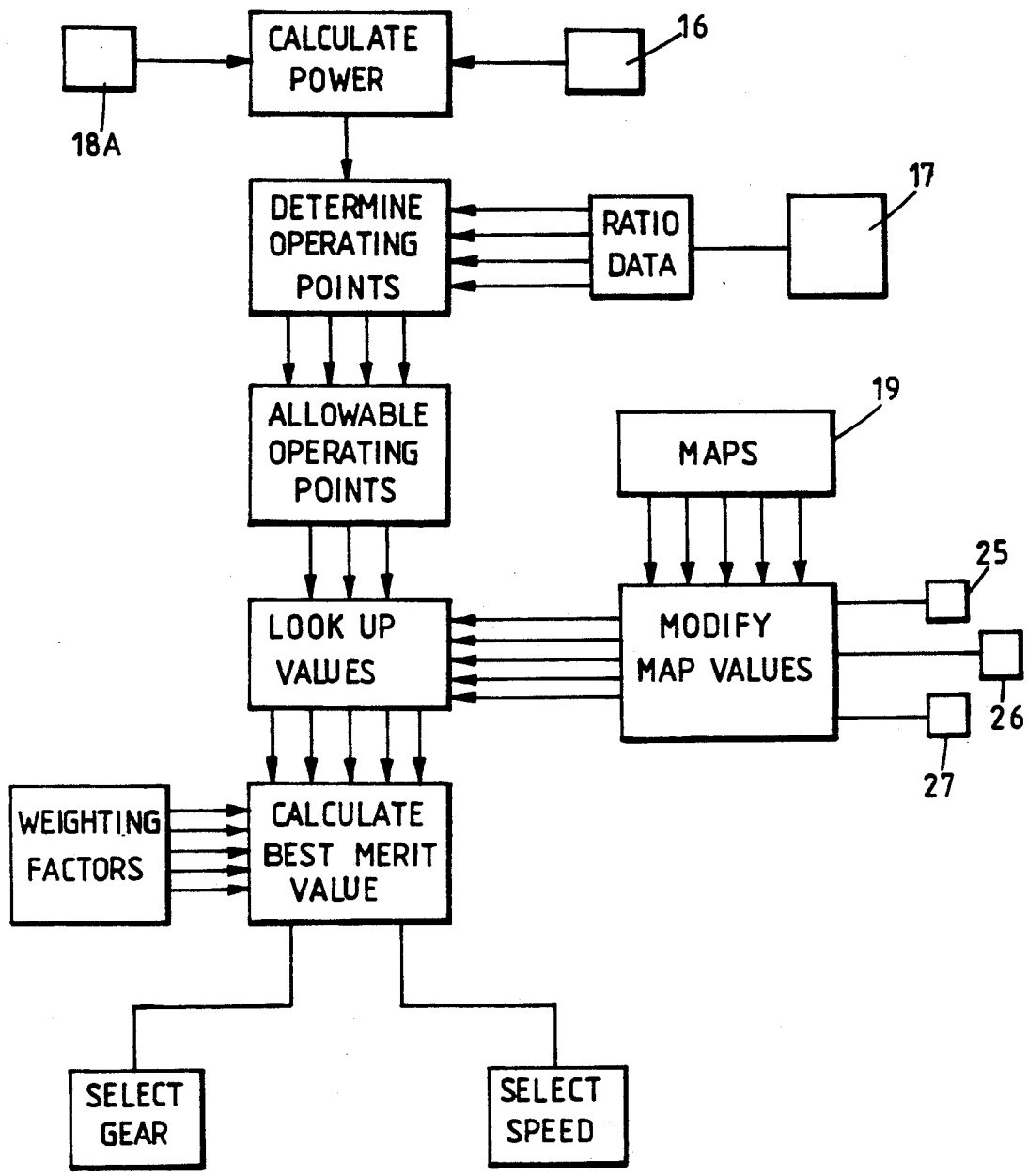

An example of a power unit in accordance with the invention will now be described with reference to the accompanying drawings in which:

FIG. 1 is a block diagram showing the power unit and the associated control systems, FIG. 2 is a diagram illustrating one level of power operation of the vehicle, FIGS. 3, 4, 5 and 6 show maps relative to a particular engine, the data contained in the maps having been determined by testing an engine, and FIG. 7 shows a flow diagram.

Referring to FIG. 1 of the drawings there is illustrated at 10 a compression ignition engine to which fuel is supplied by a fuel system 11 which is controlled by an electronic fuel control system indicated at 12. The engine is coupled to a discrete ratio multi ratio gear box 13, the output shaft 14 of which is coupled to the usual transmission of the vehicle. The selection of a gear ratio of the gear box is effected by an electrically controlled selection mechanism 15 which is controlled by an electronic ratio control system 15A.

The fuel control system 12 is supplied with an engine speed signal by means of a transducer 16. Moreover, the fuel control system 12 receives a driver demand signal which is generated by a transducer 18 responsive to the position of the throttle pedal of the vehicle.

In operation, the fuel control system 12 operates to determine the amount of fuel which is supplied to the engine 10 by the fuel system 11, in response to a power demand signal supplied to the control system by the transducer 18. The control system acts to ensure that the maximum allowed engine speed is not exceeded and will also act to control the idling speed of the engine. In addition, the control system 12 acts to ensure that the maximum torque delivered by the engine does not exceed the maker's recommendations and it also acts to ensure that the levels of pollutants in the engine exhaust do not exceed the levels allowed by the exhaust emission regulations.

The selected ratio of the gear box 13 will clearly determine, for a given road speed of the vehicle, the actual engine speed and for a given vehicle speed there may be, for example, three gear ratios which could be selected each of which will result in the engine operating within its allowed speed range. In the past, the control system 15A of the gear box would have selected the ratio which provides the lowest engine speed.

FIG. 2 illustrates a selected engine power curve, the dotted vertical lines 20, 21 indicating the maximum allowed engine speed and the engine idling speed respectively. Three points 22, 23 and 24 are indicated on the power curve, the points corresponding to the engine speed for a given vehicle road speed with the fifth, fourth and third gear ratios of the gear box selected. The control system 15A has to decide which of the three gear ratios is selected.

Associated with the ratio control system 15A is a series of maps collectively indicated at 19. The maps contain pre-recorded data obtained by the engine in a test cell at different speeds and loads. The data obtained during the engine test is corrected for the ambient temperature, pressure and humidity prior to being recorded in the maps. One map contains data indicative of the fuel consumption of the engine and the remaining maps contain data indicative of constituents of the engine exhaust, i.e. smoke, hydrocarbons, NOx and particulates respectively.

The ratio control system 15A also receives a road speed signal obtained from a transducer 17 associated with the output shaft of the gear box and an engine torque signal which can be obtained from the fuel control system 12 as the actual fuel level signal or it may be obtained from a torque measuring sensor 18A which is mounted on the engine.

The ratio control system 15A in making the assessment for the purpose of ratio selection first of all determines at the current operating point of the engine and gearbox, the engine power which is being developed. This is achieved by multiplying together the values of engine speed and engine torque. Also calculated are the engine speeds in the different gear ratios which would be required to achieve the current vehicle speed. This calculation is achieved knowing the actual gear ratios and the speed of the output shaft of the gear box and a corresponding set of engine operating points on the previously calculated engine power curve can be determined. If any of the operating points lies outside the allowable engine operating range, it is discarded. As an example, the engine speed may exceed the allowed maximum speed or be below &.he allowed minimum speed or the load on the engine may be excessive.

In the case of the allowed operating points, the aforesaid maps 19 are consulted on an individual allowed operating point basis and the values of fuel consumption and exhaust emissions obtained from the maps are adjusted in accordance with the prevailing temperature, pressure and humidity, the values of which are provided by transducers 25, 26, 27. At each operating point, the adjusted values of fuel consumption and exhaust emissions, as further modified by respective weighting factors, are added together to produce the so called "cost" figure, the reciprocal of this being the "merit" figure. It should be noted that the "cost" figure, although it includes a factor, namely, the fuel consumption which can be expressed in monetary terms, is in fact a unitless figure. The merit or cost figures for each of the allowed operating points are compared, and the gear ratio which is associated with the lower or lowest cost figure is indicated.

The indicated ratio may be the ratio which is in use, in which case no ratio change takes place. If however, a different ratio is indicated, a signal is provided to effect the change of ratio and also a change in the engine speed by way of the fuel control system.

Figure 4:
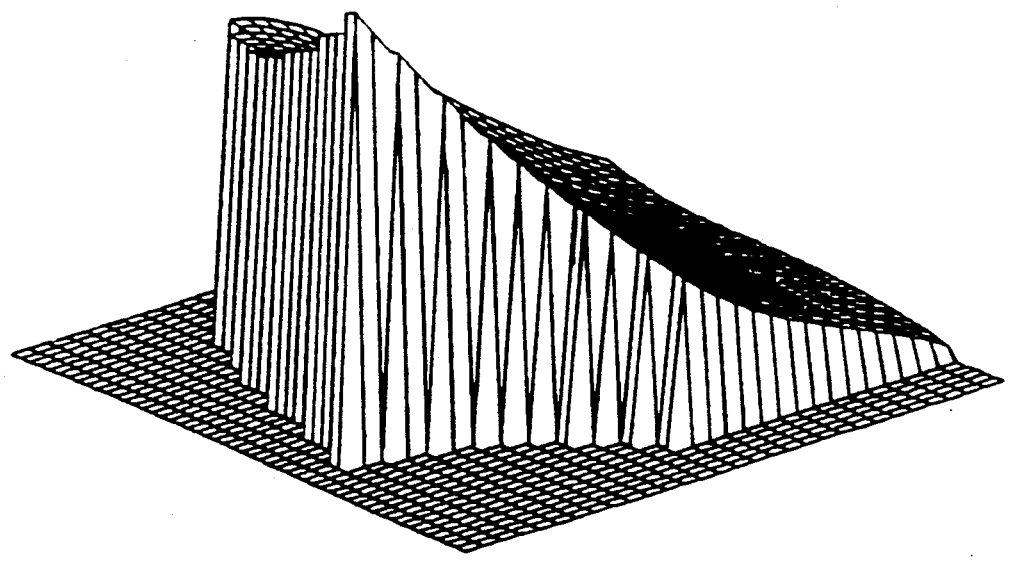

As an illustration and referring to FIG. 2, the fuel consumption at point 24 will be less than at point 23 and this in turn will be less than that at point 22. However, FIG. 4 shows that the level of Nox will be high for point 22 with points 23 and 24 having lower values. Moreover, an examination of FIG. 5 shows that at point 22 there will be a higher level of smoke than at the other two points and FIG. 6 shows that the level of hydrocarbons will be least at point 22 and greatest at point 24. It would appear, therefore that so far as the exhaust emissions are concerned, it is desirable to select the fourth ratio of the gear box to allow the engine to function at point 23. At this point the fuel consumption will be higher than at point 24 and it is a matter of deciding which should have priority and this is done using the weighting factors.

In a five speed gear box, it would be usual for the driver of the vehicle to be able to select the lowest i.e. first, gear ratio and with this gear ratio selected the ratio control system 15A would be inoperative. Moreover, it will be necessary to introduce some hysteresis into the system to ensure that small changes of vehicle speed and engine load are ignored.

FIG. 7 shows the flow diagram for the series of calculations which are necessary to determine which ratio is selected in the discrete ratio gear box.

In the case of the application of the invention to a continuously variable gear box the engine speed has to be adjusted as the ratio change is taking place to ensure that the vehicle speed remains constant. The engine power can be calculated as described and a constrained optimising technique is used to determine the optimum operating point along a line of constant power across the allowed engine speed/load operating envelope corresponding to the calculated power. In determining the optimum operating point, the corrected values of fuel consumption and exhaust emissions are again used in conjunction with the weighting factors to determine the cost or merit figure. Once the optimum operating point has been determined, a signal is provided to the gear box control system to achieve that ratio and at the same time a signal is passed to the fuel control system to adjust the engine speed.

I claim:

1. A power unit for a vehicle, the power unit including an internal combustion engine and a gear box coupled to the engine, the gear box in use being coupled to the driving wheels of the vehicle, a fuel control system operable to control the delivery of fuel to the engine in response to a power demand signal set by the driver of the vehicle, a plurality of maps containing prerecorded data relative to the constituents of the engine exhaust and the engine fuel consumption within a given engine speed and power range, means demand for determining allowable engine operating speeds at a given vehicle speed and driver demand, means for determining from the data in the maps, the values of fuel consumption and exhaust constituents at individual allowable engine operating speeds, means for storing weighting factors for fuel consumption and exhaust constituents, and means for calculating merit figures for the operation of the engine in the possible fear ratios of the gear box using the values of fuel consumption and exhaust constituents as modified by the weighting factors, and further means operable to indicate which gear ratio will provide the higher or highest merit figure or the lowest cost figure.

2. A power unit according to claim 1, including means for modifying the data stored in the maps in accordance with prevailing engine operating conditions.

3. A power unit according to claim 1, in which the gear box is a discrete ratio gear box.

4. A power unit according to claim 1, in which gear box is a continuously variable ratio gear box.

* * * * *